(12) United States Patent
Kreiling

(10) Patent No.: US 7,481,481 B2
(45) Date of Patent: Jan. 27, 2009

(54) CONVERTIBLE

(75) Inventor: Nils Kreiling, Osnabrück (DE)

(73) Assignee: Wilhelm Karmann GmbH, Oanabrueck (DE)

( * ) Notice: Subject to any disclaimer, the term of this patent is extended or adjusted under 35 U.S.C. 154(b) by 0 days.

(21) Appl. No.: 10/599,484

(22) PCT Filed: Mar. 17, 2005

(86) PCT No.: PCT/DE2005/000486

§ 371 (c)(1),
(2), (4) Date: Jan. 12, 2007

(87) PCT Pub. No.: WO2005/095140

PCT Pub. Date: Oct. 13, 2005

(65) Prior Publication Data

US 2007/0170746 A1 Jul. 26, 2007

(51) Int. Cl.
*B60J 7/00* (2006.01)
(52) U.S. Cl. .............. 296/107.01; 296/117; 296/107.07
(58) Field of Classification Search ............ 296/107.01, 296/117, 107.07
See application file for complete search history.

(56) References Cited

U.S. PATENT DOCUMENTS 6,305,735 B1 * 10/2001 Neubrand ................... 296/116

FOREIGN PATENT DOCUMENTS

DE 19706417 C1 * 7/1998
DE 19959317 C1 * 1/2008

* cited by examiner

*Primary Examiner*—Lori L Lyjak
(74) *Attorney, Agent, or Firm*—Quinn Law Group, PLLC; Christopher W. Quinn

(57) ABSTRACT

A convertible vehicle with a roof having a roof covering and several lateral frame parts, which at least partially span the roof covering when roof is closed and follow each other in the longitudinal direction of the vehicle, in which a rear frame part extends from a window parapet line with an upward extending component. The adjacent frame part, preceding the rear frame part in the direction of travel when the roof is closed, can be moved without a force transfer through the rear frame part by at least one drive provided for roof opening, and the rear frame part is suspended on a gear mechanism that transfers the drive force and can be moved by it.

17 Claims, 2 Drawing Sheets

CONVERTIBLE

CROSS-REFERENCE TO RELATED APPLICATION(S)

This application is a US National Phase of International Application No. PCT/DE 2005/000486, filed Mar. 17, 2005, which claims priority to German 10 2004 015 665.4, filed Mar. 31, 2004. The entire contents of the above identified applications are incorporated herein by reference.

TECHNICAL FIELD

The invention relates to a convertible vehicle with a roof spanned by a covering.

BACKGROUND OF THE INVENTION

Numerous convertible vehicles are known, which have a flexible roof covering secured on a roof frame, which is stretched in the closed state over lateral frame parts lying along the direction of travel. In this case, not all of the several frame parts to be connected one behind the other in the closed state need to participate in tightening of the covering. Such convertibles are also often referred to as soft tops.

To move the roof, it is also known to provide the rear lateral frame parts, with respect to the travel direction, with rigid links, which lengthen the frame parts in the auto body and can be connected to pivot with main supports assigned to the corresponding vehicle sides. Drives can engage with them, in order to cause the roof to move in the opening or closing direction. Since the main supports are situated essentially beneath the rear end of the roof, the drives must be dimensioned sufficiently large to be able to counteract the entire moment of inertia of the roof, which is often provided with a relatively heavy roof peak on its free end facing the windshield frame. In addition, the kinematic motion of the system restricts the configuration possibilities and the resulting design positions of the rear frame part, the connection link and the main support as well as positions of the drives.

SUMMARY OF THE INVENTION

The invention is based on the problem of achieving a roof connection with reduction of the problems mentioned in a convertible vehicle with a roof spanned by a covering.

The invention solves this problem by a convertible vehicle and by a moving vehicle roof.

With the solution according to the invention, the torque to be applied can be reduced by engaging the drive on an additional side frame part arranged in front of the rear frame part; the drives can then be dimensioned smaller. In addition, it is no longer necessary that the rear frame part be directly connected to the main support, since the rear frame part is not required to transfer the drive force, but instead is itself suspended on the gear mechanism that transmits the force. The storage movement and storage position can therefore be configured more flexibly and adapted well to the corresponding vehicle.

In particular, the adjacent frame part can be connected to the rear frame part so as to pivot, and therefore carry the rear frame part along as it moves.

When the rear frame part is connected to the auto body with a lever firmly connected to the frame part through at least one separately movable connection mechanism in the form of a double joint, a defined connection is obtained for the rear frame part in each movement phase.

Particularly advantageously, the rear frame part, in its lower end area, need not have a direct connection to the auto body, at least during the roof movement, but can be secured on a support in the closed state in shape-fitting manner with its lower end, from which it is lifted out during opening. Consequently, in the stored position, it can be placed farther forward or deeper in the auto body than would be possible with a fixed pivot connection to a main support. The freedom in the storage motion is significantly increased on this account.

If a multiple linkage, especially a four-link suspension, is used for force transfer between the drive and the adjacent frame part engaging on the auto body, on one end, and on the adjacent frame part, on the other end, the linkage that transfers the force can be produced simply with standard components. Parallel storage of the adjacent frame part so secured is also possible, which is desired, for example, when only two lateral frame parts are present and this forms part of the roof peak.

Additional advantages and features of the invention can be seen from an embodiment example, schematically depicted in the drawing and described below, of the object of the invention.

DESCRIPTION OF THE PREFERRED EMBODIMENTS

Figure 1:
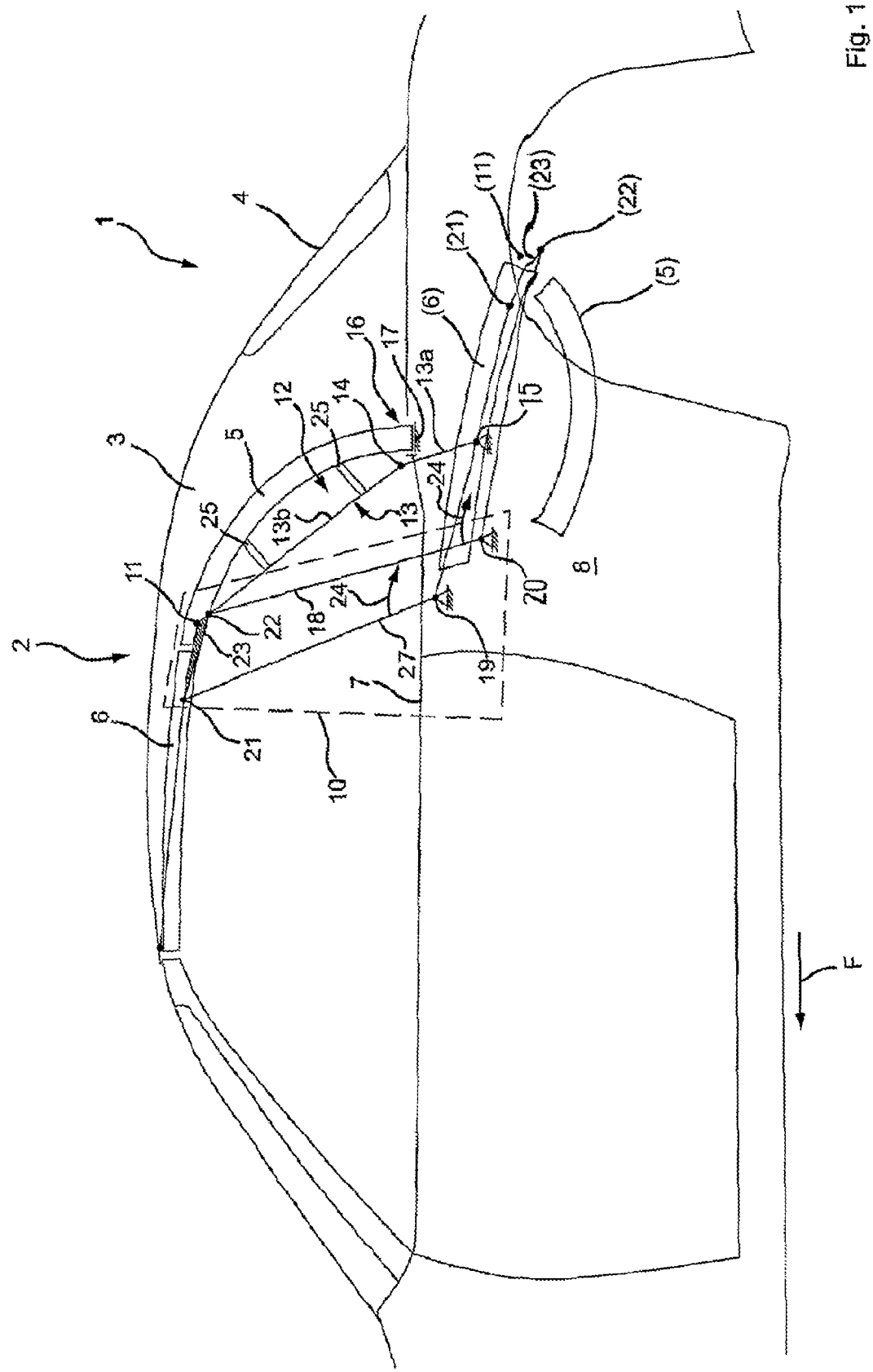
FIG. 1 shows a middle area of a convertible vehicle according to the invention in a schematic view, partially broken down, with a fully closed roof.

The convertible vehicle 1 according to the invention can be both a two-seater and a convertible vehicle with a larger internal compartment and two rows of seats, one behind the other.

It includes a movable roof 2, which has at least one flexible roof covering 3, which extends, in the embodiment example shown, over the entire movable roof 2. A flexible and therefore foldable rear window 4 can be included in the covering 3. It can also be designed rigid and consist, for example, of plastic or glass.

The roof covering 3 is at least partially secured on two lateral frame parts 5, 6 that follow each other in the longitudinal direction of the vehicle when the roof is closed. Especially in a four-seat or multiple-seat vehicle, widening of the support roof frame forward with additional frame parts is also possible. In this case, not all the lateral frame parts 5, 6, etc., need to be connected directly to the covering 3.

The rear frame part 5 extends from a window parapet line 7 of the auto body 8, with an upward component, and with a component facing the travel direction F. This rear frame part 5 is often also referred to as the main column.

When the roof is closed, an additional lateral frame part 6 is connected flush in the travel direction F, which lies adjacent to the rear frame part and is therefore subsequently referred to as the adjacent frame part. The roof 2 shown here has only two lateral frame parts 5, 6 per vehicle side. As explained above, additional ones can follow toward the front. In particular, a roof with three lateral frame parts is also considered.

The roof 2 is movable for opening and closing by means of lateral drives 9. These introduce their drive force by means of a gear mechanism 10 into the adjacent frame part 6, so that the rear frame part 5, differently than is otherwise common, performs no transfer of this drive force to the subsequent roof sections.

The rear frame part 5 is suspended on the gear mechanism 10 that transmits the force and can thereby be moved by it, like the adjacent frame part 6. To permit this coupling, the gear mechanism 10 is supplemented by a separate connection mechanism 12, which includes here a pivot lever combination 13a, 13b, also referred to as a double joint 13. The rear frame part 5 is then firmly connected to the upper pivot lever 13b of the double joint 13, for example, screwed. One possible joining is designated 25 in the figures. This is connected, on the other hand, to the adjacent frame part 6 through a pivot joint 11.

Both pivot joints 14, 15 permit one rotational degree of freedom, and the pivot planes lie parallel or are congruent.

On its lower end 16, the rear frame part 5 has no permanent body connection, but is secured in a support receptacle 17 when the roof 2 is closed, from which it is lifted out, however, during roof opening. The lower end 16 can therefore be stored in optimized fashion in the body during roof storage, without having to consider a lengthening of the links leading to the main support. During the opening and closing movement of roof 2, the lower end 16 is only connected to the body 8 through the connection mechanism 12 and the adjacent frame part 6.

The gear mechanism 10 extends from the body 8 close to the window parapet line 7 to the adjacent frame part 6 and has two almost parallel levers 27, 18 in the embodiment example, which are connected so as to move in the lower area on pivot supports 19, 20 attached to the body and in the upper area on the adjacent frame part 6 by means of pivot joints 21, 22. The gear mechanism 10 therefore forms, with these pivot joints 19, 20, 21, 22, a four-link suspension. Instead of the four-link suspension 19, 20, 21, 22, other multiple joints are also possible, possibly with link guides. The joints 21, 22 can be arranged, as here, on a rear-facing outrigger 23 of the adjacent frame part 6.

To open the roof 2, the levers 27, 18 are pivoted by drive 9 in the direction of arrow 24 about the pivot supports 19, 20 attached to the body.

Figure 2:
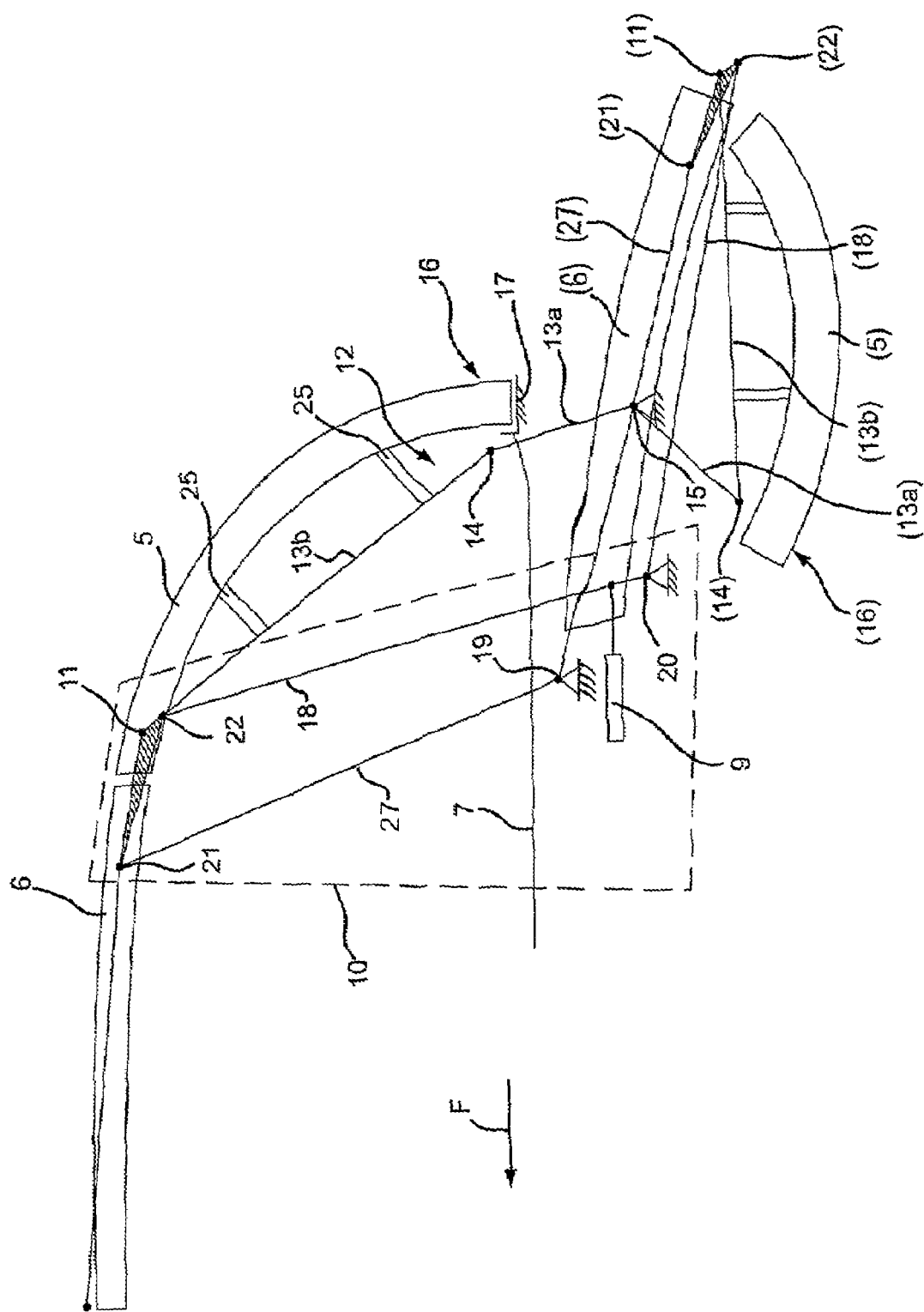
FIG. 2 shows a schematic view of the roof motion in the closed and open roof positions, without the roof covering being shown.

The roof 2 is then raised slightly, so that the rear frame part 5, with its lower end 6, is lifted out of the body support receptacle 17. The lower end 16 is therefore a free end of the rear frame part 5. As shown in FIG. 2 with the stored position of the frame parts 5, 6, it can therefore be positioned far to the front and independently of the position of a main support in vehicle 1. Because of this, the existing space can be optimally utilized and the trunk space is increased.

During opening, despite the absence of a connection to the lower end 16 of the rear frame part 5 to the body 8, a defined movement is obtained by means of the double joint 13.

The invention is applicable, in vehicles both with a roof to be moved manually and with fully or partly automatic mobility of the roof 2.

While the best modes for carrying out the invention have been described in detail, those familiar with the art to which this invention relates will recognize various alternative designs and embodiments for practicing the invention within the scope of the appended claims.

The invention claimed is:

1. A convertible vehicle (1) with a roof (2) having a roof covering (3) and several lateral frame parts (5; 6; ...), which at least partially span the roof covering (3) when the roof (2) is closed and follow each other in the longitudinal direction of the vehicle, in which a rear frame part (5) extends from a window parapet line (7) with an upward extending component,
characterized in that the adjacent frame part (6), preceding the rear frame part (5) in the direction of travel (F) when the roof (2) is closed, can be moved without a force transfer through the rear frame part (5) by at least one drive (9) provided for roof opening, and the rear frame part (5) is suspended on a gear mechanism (10) that transfers the drive force and can be moved by the drive force and, wherein the gear mechanism (10) includes a pair of substantially parallel links (27, 18) operatively connected to the frame parts (5, 6).

2. A convertible vehicle (1) according to claim 1, characterized in that the adjacent frame part (6) is connected to a pivot joint (11) along with the rear frame part (5).

3. A convertible vehicle (1) according to claim 1, characterized in that the rear frame part (5) is connected to a body (8) through at least one separate movable connection mechanism (12).

4. A convertible vehicle (1) according to claim 3, characterized in that the connection mechanism (12) includes two levers (13a; 13b) forming a double joint (13) and connected to each other on a pivot joint (14).

5. A convertible vehicle (1) according to claim 4, characterized in that the rear frame part (5) is firmly connected to a lever (13b) of the double joint (13).

6. A convertible vehicle (1) according to claim 1, characterized in that the rear frame part (5), in a lower end area (16), has no direct body connection, at least during roof movement.

7. A convertible vehicle (1) according to claim 1, characterized in that to transfer force between the drive (9) and the adjacent frame part (6), a multiple joint (10) engaging on a vehicle body (8) on one end and on an adjacent frame part (6) on the other end, is used.

8. A convertible vehicle (1) according to claim 7, characterized in that the multiple joint (10) is a four pivot joint suspension (19; 20; 21, 22).

9. A convertible vehicle (1) according to claim 8, characterized in that the four pivot joint suspension (19; 20; 21; 22) includes the two links (27; 18) and the two links (27; 18) are mounted on a body (8) and extend upward to the frame parts (5; 6) and connected so as to pivot at the frame parts (5; 6).

10. A movable vehicle roof for a convertible vehicle according to claim 1.

11. A convertible vehicle (1) according to claim 1, characterized in that the gear mechanism (10) includes a connection mechanism (12) having a pivot lever combination (13a, 13b).

12. A convertible vehicle (1) according to claim 11, characterized in that the rear frame part (5) is connected to one of the pivot lever connections (13b).

13. A convertible vehicle (1) according to claim 1, characterized in that the gear mechanism extends from the body (8) to the adjacent frame part (6).

14. A convertible vehicle (1) according to claim 9, characterized in that a pair of pivot supports (19, 20) are operatively connected to the body (8) and a pair of pivot supports (21, 22) are operatively connected to the adjacent frame part (6) and the rear frame part (5), respectively, and
the pair of links (27, 18) interconnect the pair of pivot supports (19, 20) and the pair of pivot supports (21, 22), respectively, to provide a four-link suspension.

15. A convertible vehicle (1) according to claim 1, characterized in that the links (27, 18) of the gear mechanism (10) are pivoted by the drive (9) in a direction opposite the adjacent frame part (6).

16. A convertible vehicle (1) according to claim 15, characterized in that the drive (9) is operatively connected to the link (18) of the gear mechanism (10).

17. A roof having a roof covering for covering and uncovering a convertible vehicle, said roof comprising:

a first frame part;

a second frame part that precedes said first frame part in a longitudinal direction of travel of the vehicle;

wherein said first and second lateral frame parts at least partially span the roof covering in said longitudinal direction of the vehicle when said roof is in a closed position;

at least one drive for moving said roof between said closed position and an open position;

a gear mechanism;

said first frame part is operatively connected to said gear mechanism for transferring a drive force from said at least one drive to said first frame part to move said first frame part;

wherein said second frame part is movable without a force transfer through said first frame part by said at least one drive.

* * * * *